United States Patent [19]

Konishi et al.

[11] Patent Number: 4,947,946

[45] Date of Patent: Aug. 14, 1990

[54] HOPPER GATE OPENING AND CLOSING DEVICE FOR AN AUTOMATIC WEIGHING APPARATUS

[75] Inventors: Satoshi Konishi; Masahiko Tatsuoka, both of Shiga; Toshiyuki Komatsu, Nara, all of Japan

[73] Assignee: Ishida Scales Mfg. Co. Ltd., Kyoto, Japan

[21] Appl. No.: 406,773

[22] Filed: Sep. 13, 1989

[51] Int. Cl.$^5$ .................... G01G 13/18; G01G 13/24
[52] U.S. Cl. ................................. 177/105; 177/114
[58] Field of Search ......................... 177/105–114, 177/25.18

[56] References Cited

U.S. PATENT DOCUMENTS

505,769 9/1893 King ................................. 177/105
2,963,258 12/1960 Stambera ......................... 177/105

Primary Examiner—George H. Miller, Jr.
Attorney, Agent, or Firm—Flehr, Hohbach, Test, Albritton & Herbert

[57] ABSTRACT

A double-gated pool hopper is disposed above a pair of single-gated weigh hoppers such that articles in the pool hopper can be selectably discharged into either of the weigh hoppers by opening and closing the corresponding one of the two gates of the pool hopper. A single stepping motor controls the selective opening and closing of the two gates of the pool hopper by rotating in one direction or the other and another single stepping motor controls the selective opening and closing of the gates of the pair of weigh hopper, by rotating in one direction or the other.

10 Claims, 5 Drawing Sheets

HOPPER GATE OPENING AND CLOSING DEVICE FOR AN AUTOMATIC WEIGHING APPARATUS

BACKGROUND OF THE INVENTION

This invention relates to a device for opening and closing hopper gates of an automatic weighing apparatus and a driving unit for operating such a device.

Automatic weighing apparatus such as combinational weighing systems make use of various combinations of hoppers of both single-gated and double-gated kinds as disclosed, for example, in U.S. Pat. Nos. 4,570,727, 4,678,047 and 4,708,215 assigned to the present assignee. Mechanisms for opening and closing hopper gates tend to be bulky and produce much noise. U.S. Pat. No. 4,705,125 issued Nov. 10, 1987 to Yamada et al. and assigned to the present assignee discloses a relatively compact gate operating system for a combinational weighing apparatus. This prior art device is characterized, on the one hand, as using stepping motors for opening and closing hopper gates such that it is possible, for example, to slow down the motion of a gate immediately before it completely closes and hence the noise of the closing gate can be reduced. On the other hand, however, a rotary disk is attached to the shaft of the stepping motor and gate-operating cams are affixed on both sides of this rotary disk according to this patent such that the linking mechanisms for two gates are operated by the clockwise and counter-clockwise rotations of the stepping motor. With a hopper gate-operating device thus structured, the hopper gates are opened and closed only indirectly and a relatively large number of parts are required for the mechanism. Moreover, there are problem of precision in the production of the cams and adjustment of the stepping motor because of the complicated control of its rotation.

SUMMARY OF THE INVENTION

It is a general object of the present invention to provide an improved hopper combination for an automatic weighing apparatus such as a combinational weighing apparatus.

It is a more specific object of the present invention to provide a hopper combination with a compact and efficient gate-operating device.

It is another object of the present invention to provide a hopper combination having a double-gated hopper and a pair of single-gated hoppers of which the gates can be selectably opened and closed by a compact and efficient device.

It is still another object of the present invention to provide such a hopper combination and a gate operating device including stepping motors.

It is still another object of the present invention to provide such a gate operating device using no cams as motion-communicating means.

It is still another object of the present invention to provide such a gate operating device which can be advantageously mass-produced.

The above and other objects of the present invention can be achieved by providing a combination of a double-gated hopper and a pair of single-gated hoppers such that the two gates of the double-gated hopper can be selectably opened and closed by the rotation in one direction or the other of a single stepping motor and that the two gates of the pair of single-gated hoppers can be selectably opened and closed by the rotation in one direction or the other of another single stepping motor. The stepping motor for controlling the gates of the double-gated hopper has an elongated member directly attached to its shaft so as to unistructurally rotate therewith. The member extends in mutually opposite perpendicular directions with respect to the shaft and rotatably supports two rollers such that these rollers can move in a circular path as the shaft is rotated. Each of these rollers has one end of a linkage system disposed proximally such that when the shaft is rotated, one of these rollers, depending on the direction of the shaft rotation, comes into contact with the linkage system to which it is near and pushes its end part, thereby opening and closing the gate to which the activated linkage system is connected.

The stepping motor for controlling the gates of the single-gated hoppers also has an elongated member attached to its shaft but this elongated member extends only in one direction perpendicular to the shaft and rotatably supports only one roller which moves in a circular path as this stepping motor is rotated. Each gate of the single-gated hopper is attached to its own linkage system extending towards this roller such that the roller will come into contact with and push only one of these linkage systems, and not the other, as it moves in this circular path, the direction of rotation of the shaft determining which of the linkage systems is pushed and hence which of the single gates is opened and closed.

The advantages of the gate opening and closing device according to the present invention over prior art devices, such as the one disclosed in aforementioned U.S. Pat. No. 4,705,125, include the requirement of only one operating lever (or arm) to control two gates. The prior art device provides levers in a one-to-one relationship with the gates and hence requires two levers to control the opening and closing of two gates, these two links being mounted at opposite ends of the shaft of a stepping motor and in motion-communicating relationship therewith only indirectly through cams. According to the present invention, by contrast, a single arm controls the opening and closing of two gates by rotating in one direction or the other and the arm is directly connected to the motor shaft without requiring a cam. Thus, the number of required machine parts is significantly reduced according to the present invention and this leads to other advantages such as compactness of the unit and simplicity in its adjustment. Another important advantage derivable from the absence of cams is that the opening angles of the gates can be directly, and hence more easily, controlled by the angle of rotation of the motor.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

In what follows, the present invention is described with reference to an automatic weighing apparatus having a hopper combination which comprises a double-gated hopper and a pair of single-gated hoppers disposed therebelow such that articles inside the hopper above can be discharged entirely into either of the hoppers below by selectably opening one of its two gates. FIGS. 1-5 show such a hopper combination together with its gate operating mechanisms and its driving means. For the convenience of explanation, the double-gated hopper is hereinafter referred to as a pool hopper 10 having twin gates 12 for receiving, temporarily holding and then discharging an article batch to be weighed and the single-gated hoppers below the pool hopper 10 are referred to as weigh hoppers 40 for receiving article batches discharged from the pool hopper 10 above, temporarily holding and weighing the received article batch and discharging it in response to a discharge signal.

Figure 1:
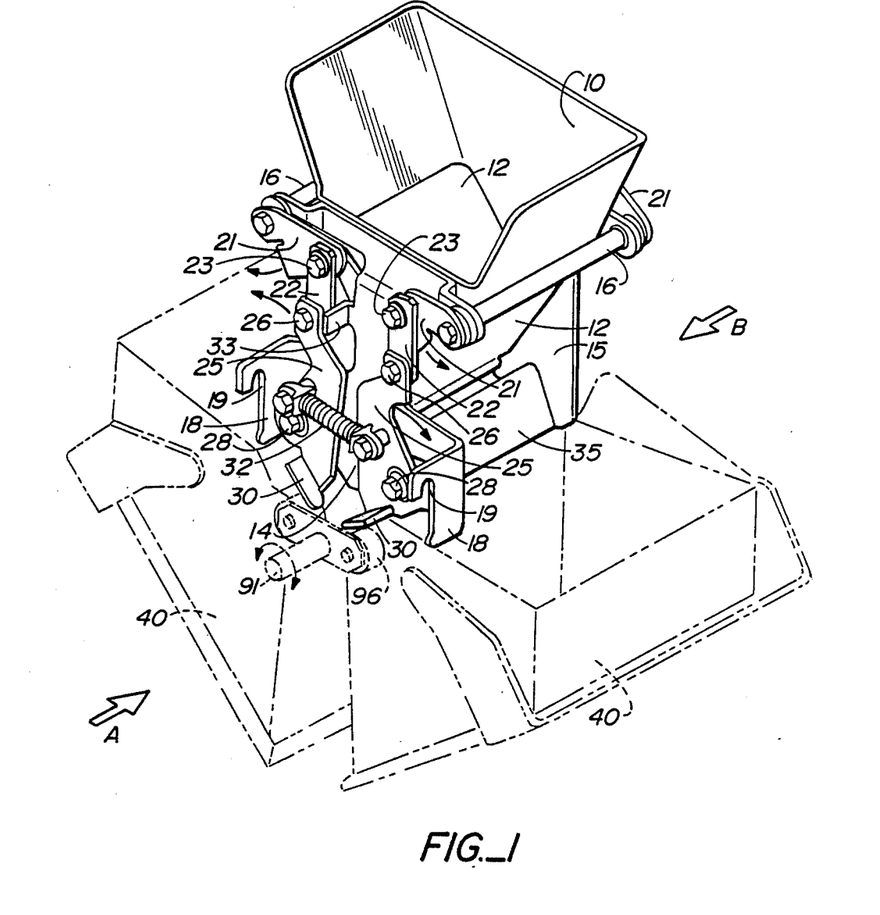
FIG. 1 is a diagonal view of a hopper combination embodying the present invention having a pool hopper and a pair of weigh hoppers disposed therebelow and more particularly a part thereof related to the opening and closing of the gates of the pool hopper.
Figure 2:
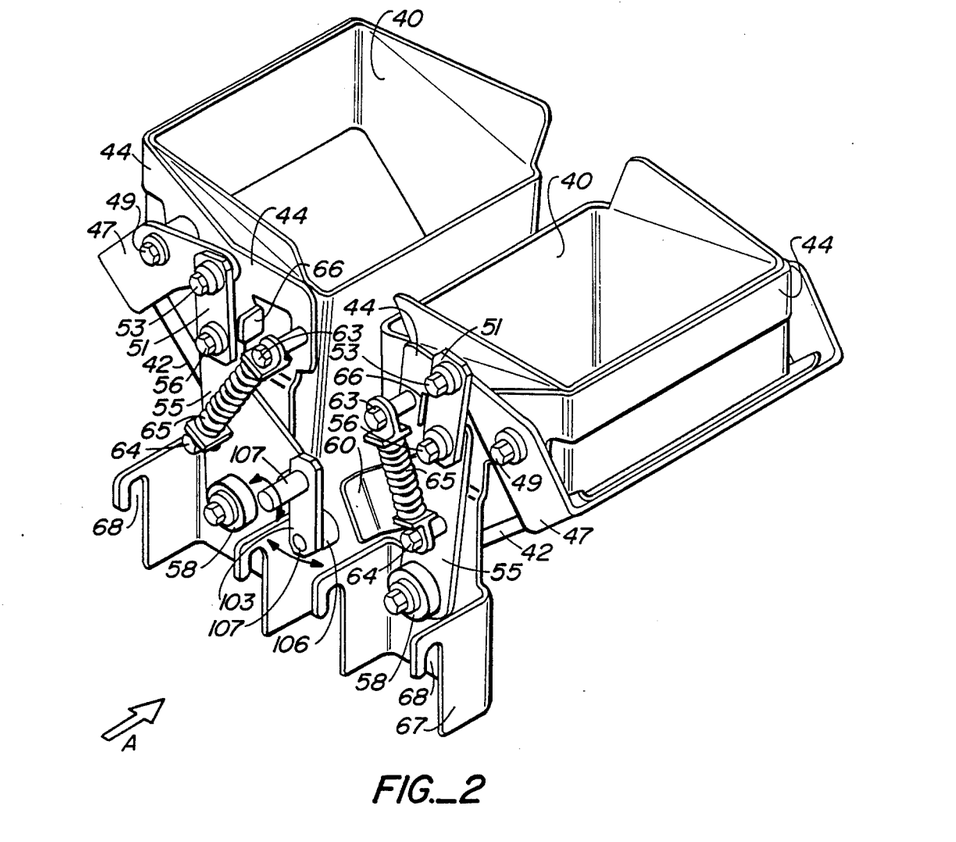
FIG. 2 is another diagonal view of the hopper combination of FIG. 1 and more particularly its weigh hoppers and a mechanism for opening and closing their gates.
Figure 3:
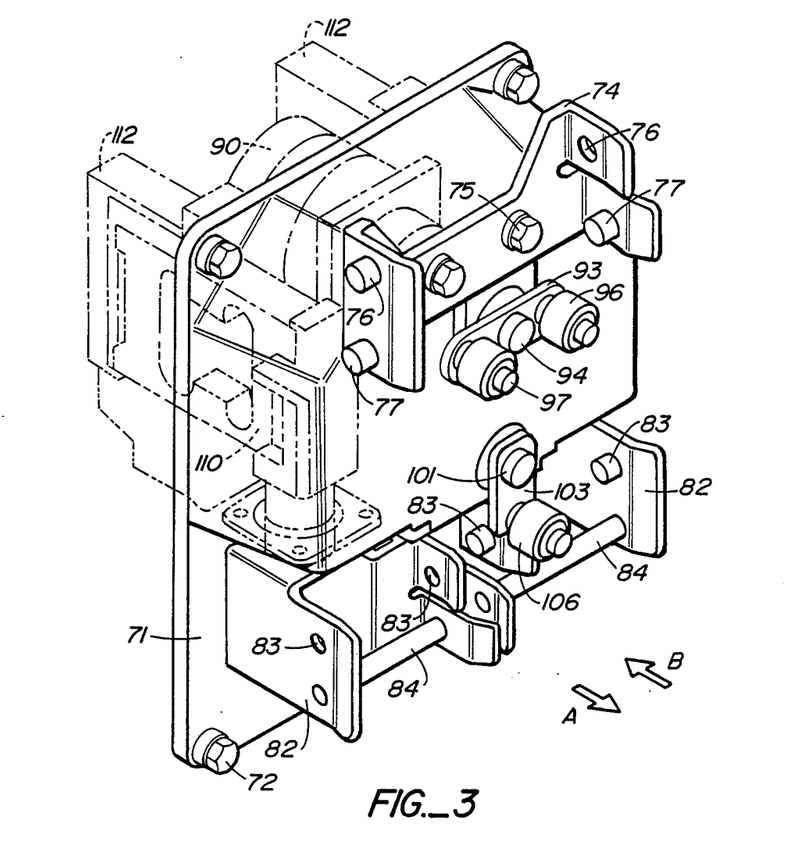
FIG. 3 is a diagonal view of a front cover of an automatic weighing apparatus to which the hopper combination of FIGS. 1 and 2 may be a part.
Figure 4:
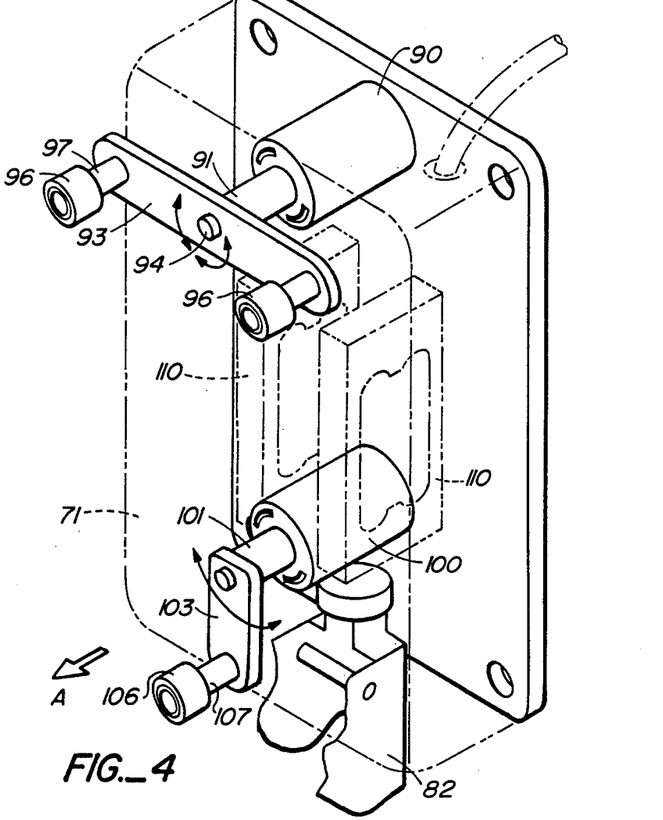
FIG. 4 is a schematic diagonal view of a portion of hopper gate driving means which may be a part of the automatic weighing apparatus of FIG. 3.
Figure 5:
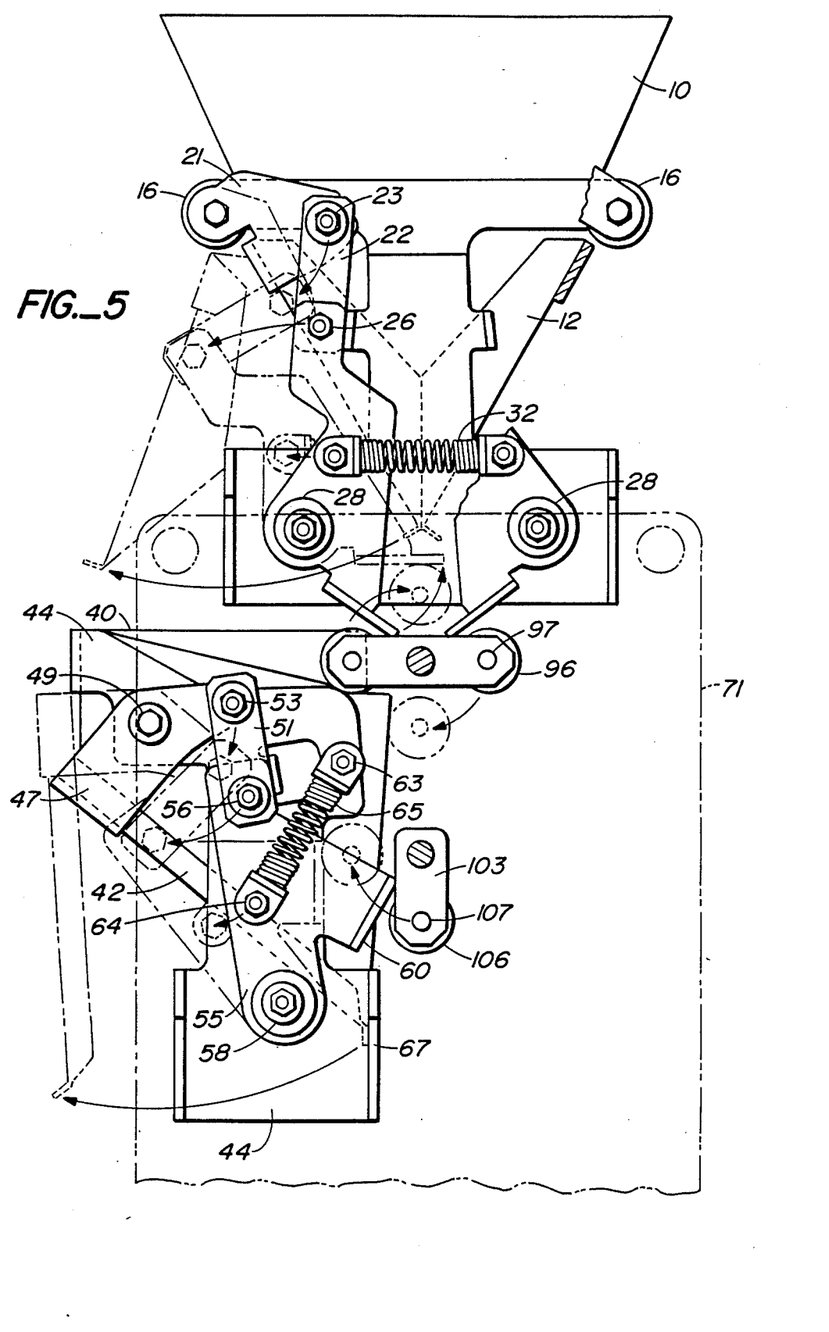
FIG. 5 is a transparent view of the hopper combination and its driving means of FIGS. 1-4 with some of the components removed for more clearly showing its gate opening and closing operations, the view being taken along the arrow B shown in FIGS. 1 and 3.

FIG. 1 shows the relative position of the pool hopper 10 and the weigh hoppers 40 as well as a part of the motion-communicating linkage systems for opening and closing the twin gates 12 of the pool hopper 10. The part of the motion-communicating linkage systems for the weigh hoppers 40 is shown in FIG. 2. FIG. 3 shows components for mounting the hopper combination of FIGS. 1 and 2 and parts of its driving means. FIG. 4 shows the gate driving means more clearly. FIG. 5 is presented for showing more clearly the operations of the individual components of the motion-communicating linkage systems and the gate driving means. These figures are intended to be referenced simultaneously for clear understanding.

With reference firstly to FIG. 1, the pool hopper 10 with twin gates 12 is supported by supporting members 14 and 15 from the front and the back (as seen in the direction of the arrow A). A pair of supporting rods 16 extending in the direction of A and sandwiching the pool hopper 10 therebetween is attached to the supporting members 14 and 15. The frontal supporting member 14 has forwardly protruding parts 18 with grooves 19 formed vertically therein for the purpose to be described below.

A pair of gate links 21 is attached to the twin gates 12 of the pool hopper 10, each supported at one end rotatably around one of the supporting rods 16 and extending toward each other to the other end where it is rotatably connected around a pin 23 to one end of a linking piece 22. The other end of the linking piece 22 is rotatably connected around another pin 26 to a rotary plate 25 which is supported rotatably around a stationary supporting pin 28. At the bottom, the rotary plate 25 is bent forward (opposite to the direction of the arrow A in FIG. 1) to form a flat, plate-like contact part 30. The two rotary plates 25 thus linked respectively to the two gates 12 of the pool hopper 10 are connected to each other through a spring 32 and are thereby subjected to a biasing force which tends to pull them toward each other. There are stoppers 33 protruding forward from the frontal supporting member 14, preventing the two rotary plates 25 from approaching each other beyond a certain limit. In FIG. 1, numeral 35 indicates a guiding plate disposed below the twin gates 12 for selectively guiding the articles discharged from the pool hopper 10 to a desired one of the weigh hoppers 40 below.

FIG. 2 shows the pair of single-gated weigh hoppers 40 disposed below the pool hopper 10 as shown in FIG. 1 and the part of the gate opening and closing device controlling their single gates 42. In FIG. 2, numerals 44 indicate supporting members firmly supporting the weigh hoppers 40 and numerals 47 indicate gate linking members which are attached to the weigh hopper gates 42 so as to move unistructurally therewith around supporting pins 49 affixed to the weigh hopper supporting members 44. The two gate linking members 47 attached to the gates 42 have parts which extend toward each other from the positions of these supporting pins 49 and each connect rotatably to one end of a linking piece 51 around a pin 53. The other end of the linking piece 51 is connected rotatably to a rotary plate 55 around another pin 56. The rotary plate 55 is supported rotatably by and around a supporting pin 58. Each rotary plate 55 has a forwardly protruding contact part 60 for a linkage-forming purpose to be described below (although only the one protruding from the rotary plate 55 on the right-hand side in FIG. 2 is visible). The arrow A shown in FIG. 1 is also shown in FIG. 2 and the direction of protrusion of the contact parts 60 is also to be understood with respect to this arrow as regarding the contact parts 30 described above with reference to FIG. 1. Numerals 63 indicate pins attached to the weigh hopper supporting members 44 and numerals 64 indicate pins attached to the rotary plates 55. A spring 65 is stretched between each pair of these pins 63 and 64 so as to provide a biasing force which tends to cause the rotary plate 55 to rotate around the supporting pin 58 and to thereby close the gate 42. Stoppers 66, which are forwardly (opposite to the arrow A) protruding parts of the weigh hopper supporting members 44, are provided for limiting the angular displacements of the rotary plates 55 by the biasing forces of the springs 65. Numeral 67 indicates a hanger extending forward from a bottom part of the supporting member 44. Each hanger 67 is formed with vertical grooves 68 for a purpose to be described below.

Reference is made next to FIG. 3 which shows an assembly by means of which the hopper combination shown in FIGS. 1 and 2 is attached to the main body of the automatic weighing apparatus of which the hopper combination is a part. The arrow A shown in FIG. 3 indicates the relative orientation of this assembly with respect to the hopper combination of FIGS. 1 and 2.

In FIG. 3, numeral 71 indicates a front cover affixed by screws 72 or the like through a sealing member to a front surface of the main body of the automatic weighing apparatus. A pool hopper hanger 74 is affixed to the front cover 1 by a screw 75 or the like. Engaging pins 76 (only the one on the left-hand side being visible in FIG.

3) for removably engaging the pool hopper 10 through the grooves 19 (shown in FIG. 1) are affixed to an upper part of the hanger 74. Stopper pins 77 are provided at a lower part of the hanger 74 for preventing the pool hopper 10 from rotating around the engaging pins 76 to invade the space for the main body of the weighing apparatus.

Numerals 82 indicate a pair of weigh hopper hangers disposed symmetrically on the left-hand and right-hand sides on the front cover 71 for supporting the weigh hoppers 40. A gap is provided between these weigh hopper hangers 82 and the front cover 71 such that the weigh hopper hangers 82 are vertically displaceable with respect to the front cover 71. Weigh hopper engaging pins 83 for removably engaging the weigh hoppers 40 by their hangers 67 through the grooves 68 are provided at upper parts of the weigh hopper hangers 82. (Protruding parts of the engaging pins 83 from the hanger 82 on the left-hand side are not visible in FIG. 3.) Stopper rods 84 are attached to lower parts of the weigh hopper hangers 82 for preventing the weigh hoppers 40 from rotating around the pins 83 to invade the space for the main body of the weighing apparatus.

The driving means embodying the present invention for the hopper combination described above by way of FIGS. 1 and 2 is explained next with reference to both FIGS. 3 and 4. In FIGS. 3 and 4, numeral 90 indicates a stepping motor which is for controlling the motion of the pool hopper gates 12 and is attached to the back surface of the aforementioned front cover 71 so as to be within the main body of the weighing apparatus. The main shaft 91 of this stepping motor 90 extends to the front of the front cover 71 and an elongated member (hereinafter referred to as an arm) 93 is securely attached to this shaft 91 by a screw 94 or the like. The arm 93 extends in mutually (diametrically) opposite directions from, and perpendicularly to, the shaft 91 and normally assumes a horizontal position as shown in FIG. 3 when the stepping motor 90 is not activated. Attached at both ends of the arm 93 distal from the shaft 91 are roller pins 97, each rotatably supporting a roller 96 therearound.

As shown in FIG. 4, another stepping motor 100 (with its main shaft shown at 101) for controlling the motion of the single gates 42 of the weigh hoppers 40 is attached to the front cover 71 below the other stepping motor 90 for controlling the pool hopper gates 12. As shown both in FIGS. 3 and 4, an arm 103 is attached perpendicularly to this shaft 101 and unidirectionally extending therefrom. A roller pin 107 is securely attached to the distal end of the arm 103 away from the shaft 101 and a contact roller 106 is rotatably supported around this roller pin 107.

In FIGS. 3 and 4, numerals 110 each indicate a load cell individually associated with one of the weigh hoppers 40 for measuring the weight of articles therein. One end of each load cell 110 is fastened to one of the weigh hopper hangers 82, the other end thereof being fastened to a bracket 112 securely affixed to the main body of the weighing apparatus.

Next, the gate opening and closing operations by the driving means described above by way of FIGS. 3 and 4 and the motion-communicating linkage means shown in FIGS. 1 and 2 are described with reference not only to FIGS. 1–4 but also to FIG. 5 which is a transparent view of the hopper combination described above taken in the direction of the arrow B shown in FIGS. 1 and 3. Many of the components shown in FIGS. 1–4 are omitted in FIG. 5 for the purpose of clarity.

For the convenience of explanation, let us assume that the hopper combination described above as well as its associated driving means are parts of a combinational weighing apparatus of a kind disclosed, for example, in aforementioned U.S. Pat. Nos. 4,570,727, 4,678,047 and 4,708,215. A process for weighing articles starts by supplying articles to the pool hopper 10 and the batch of articles thus received by the pool hopper 10 is subsequently discharged into one of the weigh hoppers 40, the choice being made by examining which of the two is currently empty or according to a control program if both are empty.

The weight of the article batch received by either one of the weigh hoppers 40 is determined by the load cell 110 associated with that weigh hopper. Since the weigh hopper 40 is attached to the hanger 82 which is disposed so as to be vertically displaceable with respect to the front cover 71 and since it is supported by the bracket 112 through the load cell 110, the weight of the article batch causes a strain in the load cell 110 and its magnitude can be detected by measuring this strain in a well known manner.

If the weight of the article batch received by the weigh hopper 40 and determined by the load cell 110 associated therewith is such that the automatic weighing apparatus decides to have it discharged, the single gate 42 associated with this selected weigh hopper 40 is opened and closed in the next cycle of operation of the weighing apparatus and a signal indicating that this weigh hopper 40 has become empty is communicated to the pool hopper 10, causing the pool hopper 10 to supply a new article batch to the weigh hopper 40 which is now empty. According to the present invention, this supply of an article batch from the pool hopper 10 to the selected one of the weigh hoppers 40 is effected by rotating the stepping motor 90 to the right or to the left, depending upon which of the two weigh hoppers 40 below the pool hopper 10 should receive the article batch. With reference to FIG. 5, the stepping motor 90 is rotated to the right (clockwise) if the gate 12 on the left-hand side is to be opened and to the left if the gate 12 on the right-hand side is to be opened. For the convenience of explanation, it is hereinafter assumed that the gate 12 on the left-hand side is to be opened.

As the stepping motor 90 rotates to the right, the contact roller 96 attached to the left-hand end of the arm 93 begins to move along a circular path around the shaft 91 of the stepping motor 90. The flat contact part 30 of the rotary plate 25 on the left-hand side, which has been situated close to and opposite to this contact roller 96, is thereby pushed by the aforementioned circular motion of the contact roller 96, causing the rotary plate 25 to rotate around the supporting pin 28 therethrough. This causes the pin 26 to move to the left-hand side (as shown by a small arrow in FIG. 1) and this motion of the lower end of the linking piece 22 is communicated through the pin 23 and the gate link 21 which is attached to the left-hand gate 12 and supported rotatably around the supporting rod 16, causing the left-hand gate 12 to open. The speed with which the gate 12 is opened is controlled by the rotary motion of the stepping motor 90. When the contact part 30 is lifted to its highest position, it becomes substantially horizontal and thereafter maintains this position, holding the gate 12 in its open position. When the gate 12 is to be closed, the direction of rotation of the stepping motor 90 is reversed. In the meantime, the other one (on the right-hand side in the above example) of the contact rollers 96 moves downward and away from the contact part 30 opposite thereto (not shown in FIG. 5). Thus, the right-hand gate is not disturbed by the opening of the left-hand gate and remains closed.

In summary, the gates 12 can be controlled mechanically by the rollers 96 and the contact parts 30. The angles of the gates 12 and the speed of their opening and closing can also be controlled by electrically controlling the pulse number to the stepping motor 90. It is also possible, as taught in aforementioned U.S. Pat. No. 4,705,125, to adjust the motion of the gates 12, depending on the type of articles to be handled for weighing.

The gates 42 of the weigh hoppers 40 can be controlled similarly by activating the other stepping motor 100. Its shaft 101 is selectably caused to turn to the right or to the left by a specified angle according to its received pulse number. After article batches in the weigh hoppers are weighed and if the control unit of the automatic weighing apparatus decides according to prespecified criteria that either one of the article batches in the weigh hoppers 40 is to be discharged, a discharge signal indicative of this determination is communicated to the stepping motor 100 which, in response thereto, decides the direction of rotation of its shaft 101. For the convenience of explanation, let us assume again that the weigh hopper 40 on the left-hand side of FIG. 5 has been selected. The shaft 101 is then rotated to the right (clock-wise in FIG. 5) and the contact roller 106, which is normally situated close and opposite to both of the contact parts 60, comes into contact with and pushed the left-hand contact part as it moves along its circular trajectory around the shaft 101. This causes the linking mechanism including the rotary plate 55, the linking piece 51 and the gate linking member 47 connected through pins 56 and 53 to bend in a way similar to the linking mechanism for the operation of the pool hopper gates 12 described above such that the gate linking member 47 is rotated around its supporting pin 49 to open the gate 42 to discharge the article batch therethrough while the spring 65 is stretched against its biasing compressive force. After the discharge of the article batch from the selected weigh hopper 40, the stepping motor 100 reverses the direction of its rotation, now turning to the left. Thus, the spring 65 causes the linking mechanism to return to its original position and the gate 42 to be closed. A similar operation takes place if the weigh hopper on the right-hand side is selected for a discharge. The mode of opening and closing motion can also be controlled as explained above in connection with the stepping motor 90 for the operation of the gates 12 of the pool hopper 10.

The foregoing description of a preferred embodiment of the invention has been presented for purposes of illustration and description. It is not intended to be exhaustive or to limit the invention to the precise form disclosed, and many modifications and variations are possible in light of the above teaching. For example, the motors 90 and 100 need not be stepping motors but maybe motors of a different kind such as servomotors. As another example, although the single-gated hopper 10 was identified as a pool hopper and the pair of double-gated hoppers 40 therebelow as weigh hoppers in the description given above, such identification is not intended to limit the scope of the invention. It would be obvious to a person skilled in the art that the single-gated hopper at the top may be linked with a lord cell and be identified as a weigh hopper, while the pair of single-gated hoppers therebelow may be identified as memory hoppers for temporarily holding weighed article batches according to a technology known among persons skilled in the combinational weighing art. Similarly, the contact rollers 96 and 106 for activating the linkage systems, for example, may be replaced by any similarly functioning components.

Figure 6:
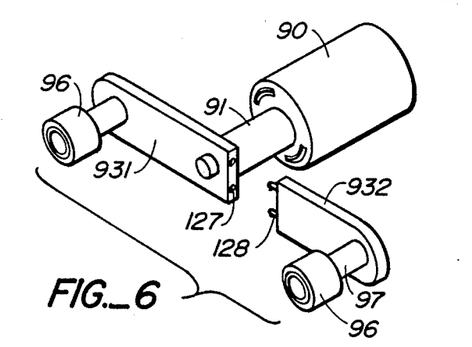
FIG. 6 is a diagonal view of a bar (called an arm) to be attached to the shaft of a stepping motor according to another embodiment of the present invention.
Figure 7:
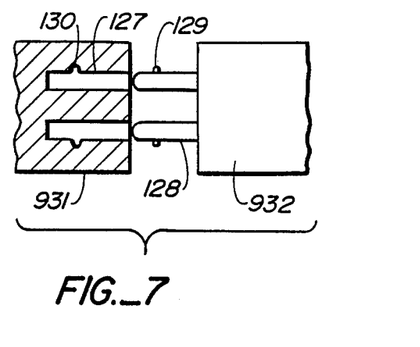
FIG. 7 is a sectional view of the arm of FIG. 6.

Moreover, although the arm 93 transversely attached to the shaft 91 of the stepping motor 90 for the operation of the pool hopper gates 12 was illustrated as a single piece in FIGS. 4 and 5, this is not intended to limit the scope of the present invention. From the point of view of mass production, it is clearly disadvantageous to separately design the bidirectionally extending arm 93 for the pool hopper 10 and the unidirectionally extending arm 103 for the weigh hoppers 40. This disadvantage can be eliminated if the bidirectionally extending arm 93 is designed as shown in FIG. 6 wherein components which are substantially the same as those described above are indicated by the same numerals. The arm shown in FIG. 6 is characterized as consisting of a longer part 931 and a shorter part 932 which are easily attachable to each other. The longer part 931 is designed substantially identically to the arm 103 except two pin holes 127 are provided as shown in FIG. 6. The shorter part 932 is so designed with two pins 128 that the two pieces 931 and 932 can be engagingly joined together with the pins 12 inserted into the pin holes 127. According to a preferred embodiment of the present invention, each pin 128 is provided with a protrusion 129 near the head and the pin holes 127 are formed with matching indentations 130 as shown in FIG. 7. Any such modifications and variations that may be apparent to a person skilled in the art are intended to be included within the scope of this invention.

What is claimed is:

1. A hopper gate operating assembly for an automatic weighing apparatus, said assembly comprising,
    a motor having a shaft,
    an elongated member securely attached to said shaft and extending perpendicularly therefrom,
    a first linkage system and a second linkage system each attached to a hopper gate at one end and having a contact part formed at the other end such that said gate is opened if said contact part is pushed and displaced, and
    a contact, piece attached to said elongated member distal from said shaft so as to move along a circular path if said shaft is rotated, said contact piece being disposed proximal to said contact part of at least one of said linkage systems such that said contact piece pushes and displaces said one proximal contact part if said shaft is rotated in a specified direction.

2. The assembly of claim 1 wherein said elongated member extends in two mutually opposite directions from said shaft, there being a first contact piece and a second contact piece attached to said elongated member on mutually opposite sides of said shaft, said first and second contact pieces being disposed proximal respectively to said contact part of said first and second linkage systems such that said first contact piece pushes and displaces said contact part of said first linkage system but said contact part of said second linkage system is not pushed if said shaft is rotated in said specified direction and that said second contact piece pushes and displaces said contact part of said second linkage system but said contact part of said first linkage system is not pushed if said shaft is rotated opposite to said specified direction.

3. The assembly of claim 2 wherein each of said contact pieces includes a pin secured to said elongated member and a roller which is rotatably supported around said pin.

4. The assembly of claim 2 wherein said elongated member consists of a longer member and a shorter member detachably attached to each other, said first contact piece being on said longer member and said second contact piece being on said shorter member.

5. The assembly of claim 1 wherein said elongated member extends only in one direction from said shaft, there being only one contact piece on said elongated member, both said contact part of said first linkage system and said contact part of said second linkage system being disposed proximal to said only one contact piece such that said contact piece pushes and displaces said contact part of said first linkage system, but not said contact part of said second linkage system, if said shaft is rotated in said specified direction and that said contact piece pushes and displaces said contact part of said second linkage system, but not said contact part of said first linkage system, if said shaft is rotated opposite to said specified direction.

6. The assembly of claim 1 wherein said contact piece includes a pin secured to said elongated member and a roller which is rotatably supported around said pin.

7. In combination in an automatic weighing apparatus,
- a double-gated hopper having a pair of gates for receiving an article batch thereinto and discharging said article batch therefrom by selectably opening one of said pair of gates,
- a pair of single-gated hoppers each having a single gate, each of said single-gated hoppers being associated with one of said pair of gates of said double-gated hopper and disposed below said associated gate for receiving an article batch from said double-gated hopper,
- a first motor,
- a first gate-operating means for directly and selectively causing one or the other of said pair of gates of said double-gated hopper to open in response respectively to a rotary motion of said first motor in one direction or the other,
- a second motor, and
- a second gate-operating means for directly and selectively causing said single gate of one or the other of said pair of single-gated hoppers to open in response respectively to a rotary motion of said second stepping motor in one direction or the other.

8. The combination of claim 7 wherein said first gate-operating means includes
- a pair of linkage means each connected at one end to one of said pair of gates of said double-gated hopper and having at the other end a contact part such that a pressure applied on said contact part to cause a displacement thereof can cause the gate connected to said linkage means to open and close,
- an elongated member attached to the shaft of said first stepping motor extending perpendicularly therefrom and adapted to rotate therewith, and
- a pair of contact pieces attached to said elongated member and disposed near and opposite said contact parts such that a rotary motion of said first motor causes one of said contact pieces to press one of said contact parts.

9. The combination of claim 7 wherein said second gate-operating means include
- a pair of linkage means each connected at one end to the single gate of one of said pair of single-gated hoppers and having at the other end a contact part such that a pressure applied on said contact part to cause a displacement thereof can cause said single gate connected to said linkage means to open and close,
- an elongated member attached to the shaft of said second motor extending perpendicularly therefrom and adapted to rotate therewith, and
- a single contact piece attached to said elongated piece and disposed near and opposite said contact parts such that a rotary motion of said second motor causes said single contact piece to press one or the other of said contact parts, depending on the direction of said rotary motion of said second motor.

10. The combination of claim 7 wherein said single-gated hoppers serve as weigh hoppers for measuring the weight of articles placed therein.

* * * * *